Figure 1:
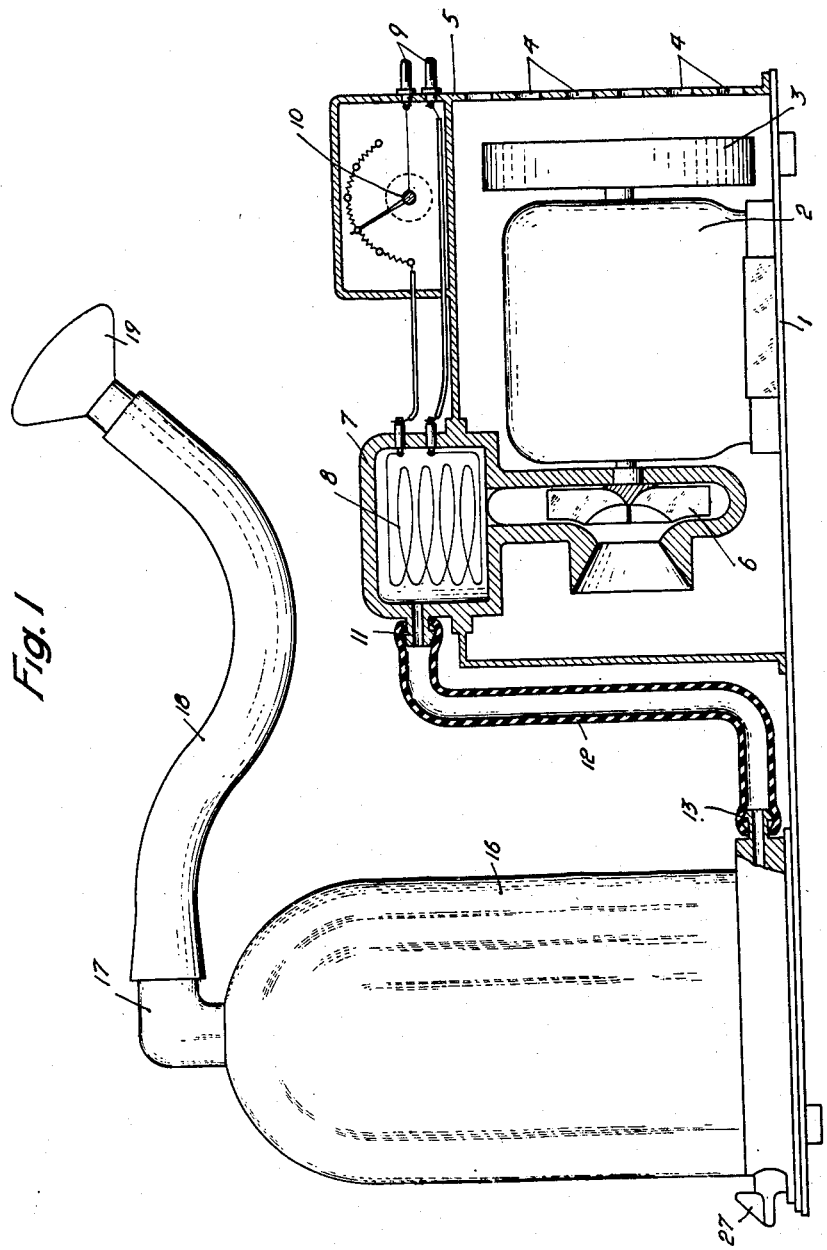

Jan. 13, 1953

F. GAUCHARD 2,625,156

AEROSOL GENERATOR

Filed Dec. 17, 1951

3 Sheets-Sheet 1

INVENTOR:
Fernand Gauchard
By Frank H. Nesch,
ATTORNEY

Jan. 13, 1953  F. GAUCHARD  2,625,156
AEROSOL GENERATOR

Filed Dec. 17, 1951  3 Sheets-Sheet 3

INVENTOR:
Fernand Gauchard.
By Frank H. Wesch.
ATTORNEY

Patented Jan. 13, 1953

2,625,156

UNITED STATES PATENT OFFICE 2,625,156

AEROSOL GENERATOR

Fernand Gauchard, Santeny, France

Application December 17, 1951, Serial No. 262,038
In France October 14, 1947

14 Claims. (Cl. 128—173)

The present specification is a continuation in part of my co-pending application, Ser. No. 54,242, filed on October 13, 1948, now abandoned.

My invention covers a novel apparatus for the local application or for the introduction into the lungs of medicinal or veterinary products in the shape of a stable suspension in air of a similar gasiform fluid of extremely fine particles.

It has been proved that such a manner of absorbing medicinal or veterinary products provides considerable advantages and leads to results that are highly interesting in the treatment of a large number of diseases.

The object of my invention is to produce a simple apparatus that is easy to handle and that includes means for adjusting the characteristic properties of the suspension obtained. It is, in fact, necessary for the operator to be allowed to adjust the size of the particles and their concentration, i. e. the number of particles contained in a predetermined volume of air inhaled by the patient, said adjustment being performed in accordance with the depth to which the product is to enter inside the respiratory system, in accordance with the actual product and in accordance with the behaviour of the patient.

According to the main feature of said apparatus, the latter includes in combination an air compressor, an atomizer, which latter is fed with compressed air or the like fluid through a pipe connected with the air compressor, means for feeding the treating product that is to form the aerosol to said atomizer, a chamber into which the atomizer projects a suspension of the product in compressed air, a system of baffle plates at the output of said chamber, a second, outer chamber inside which is housed the first chamber and into which is fed the aerosol formed by the suspension passing out of the baffle plate system after separation of the liquid particles impinging on the surfaces of the baffle plate system, said outer chamber being made at least partly of a transparent material and being provided with a gauged opening closed by a non-return valve while the output end of said second outer chamber is connected with a pipe leading to the means that serve for applying the aerosol to the patient A further object of the invention consists in associating with the gauged opening means for adjusting its size in order to reduce to a varying extent the amount of secondary air to be inhaled by the patient, said adjustment modifying the speed of passage of the suspension through the baffle plate system closing the first chamber.

A still further object of my invention consists in heating means inserted in the pipe feeding compressed air from the compressor to the atomizer in order to allow a preliminary treatment of the air that serves for atomization while preventing the air, that cools by reason of its expansion, from being applied to the patient at a temperature lower than room temperature. Said heating means are preferably adjustable.

According to an auxiliary object of my invention, the baffle plate system is also adjustable whereby the baffled path followed by the suspension has more or less marked bends which ensure the removal of those particles the diameter of which is higher than a predetermined adjustable limit diameter.

This baffle plate system may include a number of superposed rings each of which carries a perforated partition whereby the angular shifting of the rings with reference to one another allows obtaining a modification in the length of the baffle path provided for the suspension through the perforations of the superposed spaced parallel partitions.

In a second embodiment the baffled path is provided by superposed stationary partitions carried inside a hollow body assuming the shape of a surface of revolution round the axis of a spindle and movable walls rigid with the said spindle, adapted to revolve therewith, the partitions of the two series being perforated in a different manner and the angular setting of the movable walls with reference to the stationary partitions alternating therewith being adjustable through mere rotation round said axis.

In a third embodiment, the baffle plate system includes three bell-shaped parts of which two, directed downwardly, include an outer element fitted over the output end of the first chamber and a second, inner, element communicating with the inside of the outer chamber, while the third element that faces upwardly, is adapted to engage more or less the annular gap between the two first plates.

Various constructional embodiments of my invention will be disclosed hereinafter, reference being made to accompanying drawings wherein:

Fig. 1 is a general view of the apparatus, the air compressing and heating means being shown in cross-sectional view;

Fig. 2 is a sectional view of the actual aerosol generator associated with a first type of filter or baffle system;

Fig. 3 is a sectional view of a second type of filter;

Figure 4:
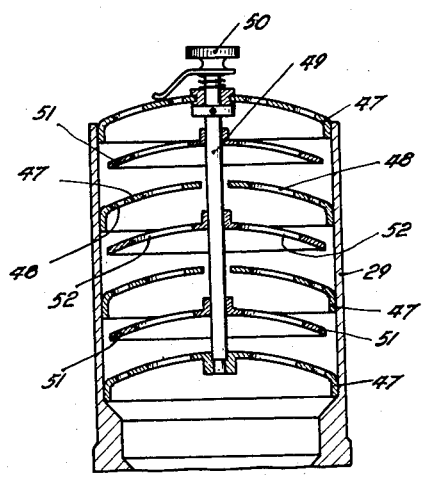

Fig. 4 is a sectional view of a third type of filter.

The apparatus illustrated in Fig. 1 is carried by a bed-plate 1. It includes an electric motor 2 driving through one end of its shaft a fan sucking air through the slots 4 provided in the casing 5 carried by the bed plate 1.

To the other end of the shaft of the motor 2 is keyed a centrifugal compressor 6, said centrifugal compressor compressing air into a capacity 7, inside which is mounted an electric resistance 8 providing for the heating of the compressed air entering said capacity.

This electric resistance is fed from the terminals 9 with the insertion therebetween of a rheostat 10. The pipe 11, at the output of the capacity 7, is connected through a pipe 12 to the input 13 of the aerosol generator to feed the latter with heated compressed air.

Figure 2:
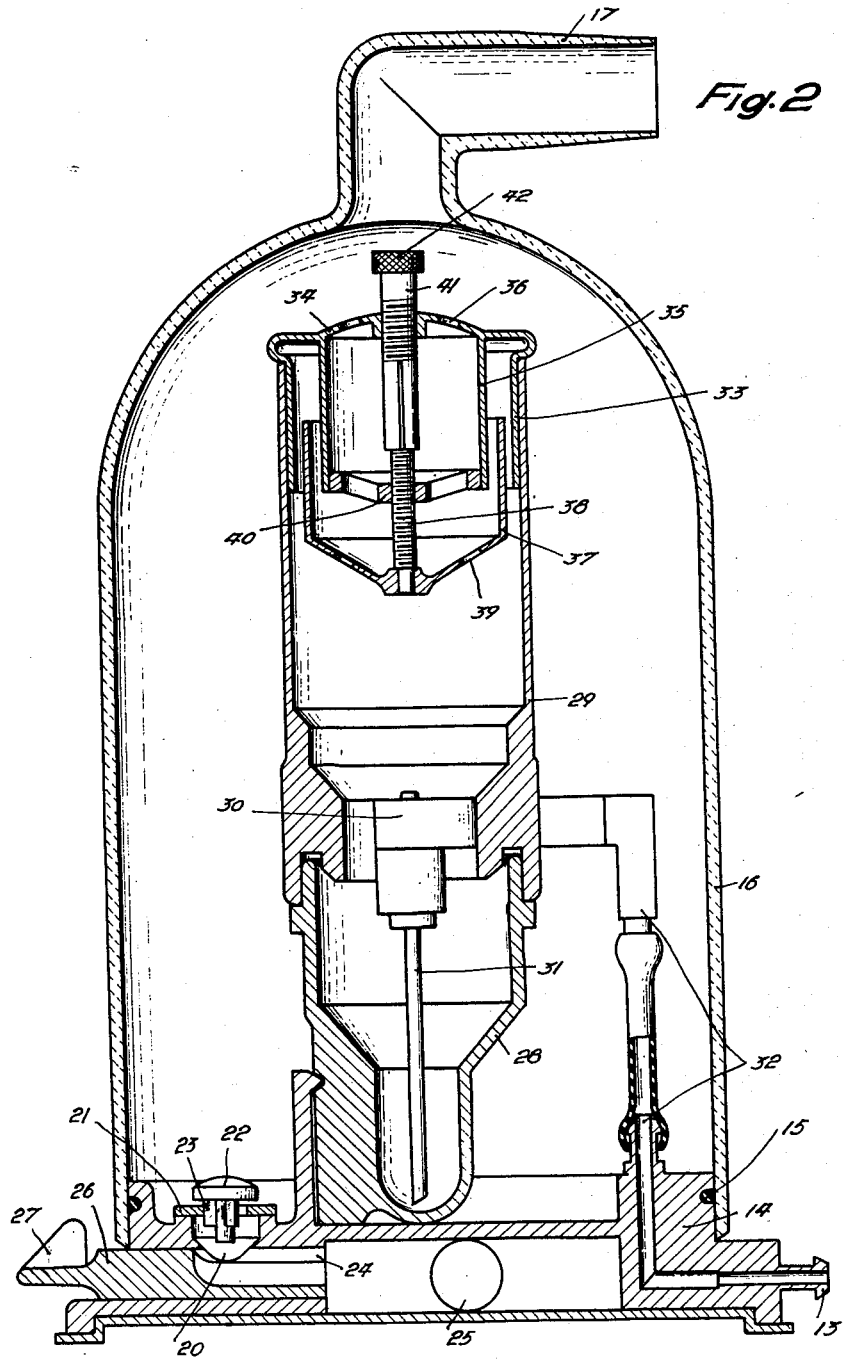

The actual generator includes a support 14 (Fig. 2) carried in its turn by the general bed-plate 1 of the apparatus. The support 14 of the generator has an outer cylindrical bearing surface in which is fitted a yielding packing 15, said cylindrical bearing surface being fitted inside a bell 16 of transparent material. Said bell 16 is provided with an output connection 17 opening into its upper end, and to which is coupled a yielding pipe 18 provided at its further end with means for applying the aerosol to the patient as illustrated in Fig. 1 by the mouthpiece 19.

The support 14 is provided with a valve system constituted by a gauged opening 20 closed by a flap valve 22 centrally carried on its seat 21, through the agency of the radial fins 23. The gauged opening 20 in the support 14 registers with a transverse bore 24 communicating with thhe atmosphere through a further bore 25, both bores being provided in the same support 14.

Inside the bore 24 is housed the plug of a cock 26 the central knob of which, 27, projects outwardly of the support 14.

The chamber constituted by the bell 16 communicates thus with the atmosphere through the opening 20 the cross-sectional area of which is adjusted through the angular setting given to the cock plug 26, the rotation of which limits said area to a varying extent. On the other hand, the gasiform fluid contained inside the bell cannot escape towards the atmosphere through the opening 20 by reason of the presence of the non-return valve constituted by the flap valve 22.

The actual aerosol generator is constituted by a container 28 which holds the liquid that is to form the suspended material in the aerosol.

The container 28 is capped by a hollow upright or flue 29 the lower end of which carries an atomizer 30 the feeding tube 31 of which opens into the bottom of the container 28 while compressed air is admitted to the atomizer through its inlet 13 and the pipe 32 connecting the latter with the actual atomizer.

The hollow upright 29 is closed at its upper end by a baffle system forming a filter. In the example illustrated in Fig. 2, this baffle system includes an outer cylinder 33 engaging the upper end of the upright 29 and having a cover 34. A cylindrical partition 35 is rigid with said cover 34 and is coaxial therewith; perforations 36 are provided in the cover 34 on the inside of the partition 35.

An upwardly directed cup-shaped member 37 with a cylindrical wall is carried by a threaded rod 38, the outer cylindrical wall of the cup-shaped member engaging the annular space between the cylindrical downwardly directed parts 33 and 35. The bottom part of the cup-shaped member 37 is perforated at 39, as illustrated.

The lower opening of the cylindrical partition 35 is closed by a nut 40 threaded over the rod 38 and rigid with radial arms extending up to the actual partition 35 so that the gasiform mixture may pass freely into the inside of the partition 35 between the successive radial arms on the nut 40.

The threaded rod 38 that engages said nut 40 may be driven into rotation through a spindle 41 rigid therewith and carrying a milled knob 42 above the cap 40.

The arrangement operates as follows:

The air compressed inside the rotary compressor 6 is heated in the chamber 7 through the electric resistance 8 and it flows through the line 12—13—32 to provide for the atomization at 30 of the liquid contained inside the container 28 into the flue 29. The dispersion thus obtained passes through the filter system inside which the larger particles of liquid are projected against the baffle surfaces. The liquid collected inside the cup-shaped member 37 above the atomizer means passes through the perforations 39 in said cup-shaped member and drops back into the container 28. The air carrying the finer liquid particles forming a suspension therein passes through the perforations 36 in the cover 34 and is dispersed inside the bell-shaped member 16. The characteristic properties of the suspension may be adjusted through action on the length of interengagement of the cylindrical walls 35, 33 and 37 and thereby on the size of the particles that should be such as will give the suspension the properties of a true aerosol. The aerosol concentration may be modified through a more or less considerable throttling of the input of atmospheric air, entering through the adjustable gauged opening 20.

The temperature of the air inside the chamber 7 is adjusted through the agency of the rheostat 10 in a manner such that after expanding inside the atomizer 30, said air may assume substantially room temperature.

Figure 3:
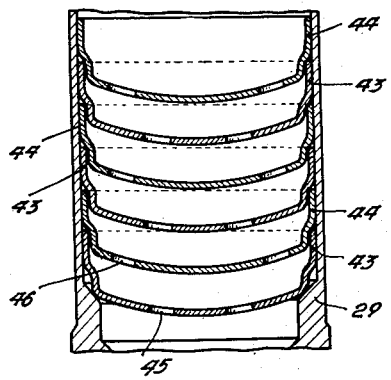

It is also possible to use as a filter, the baffle system illustrated in Fig. 3. This baffle system is constituted by a superposition of any desired number of cup-shaped members 43 and 44 alternating with one another. These cup-shaped members include vertical flanges defining the spacing between the members while their bottoms are perforated at 45 and 46 respectively, the perforations 45 of the members 43 being provided at a distance from the axis of the members that is different from that corresponding to the perforations 46 of the members 44.

It is also possible to use the filter illustrated in Fig. 4. In this case, stationary plates are positioned inside the flue 29 and prevent direct passage therethrough except through the slots or perforations 48. A rotary spindle 49 passes through the superposed plates and is revolubly carried inside the two extreme partitions. The upper end of said spindle 49 carries a knob 50 that allows adjusting its angular setting. Said spindle carries rigidly concave plates 51 of circular outline that are also provided with slots or perforations 52. The angular shifting of the spindle 49 will modify the angular setting of the slots 49 with reference to the slots 48, thereby modifying the baffled path followed by the suspension in its way through the first chamber constituted by the flue 29 beyond which it enters the bell-shaped part 16.

Several features of the above invention have been disclosed but not claimed in my copending specification No. 54,243 of October 13, 1948, now Patent No. 2,600,503.

What I claim is:

1. A generator of aerosols containing at least one liquid basic product intended for inhalation comprising a compressor of aeriform fluid, an atomizer, a pipe connecting said gas compressor with the atomizer, means for feeding the product that is to form the aerosol to said atomizer, a container into which the atomizer projects a suspension of said product in a jet of compressed fluid from the compressor, a baffle system at the outlet of the container adapted to collect the larger liquid particles of the suspension impinging against its surfaces, an outer container inside which the first container is housed and fed by the aerosol formed by the suspension passing out of the baffle system, after separation of the liquid particles impinging on the baffle system surfaces, said outer container being provided with an outlet and a gauged inlet opening for atmospheric air, a nonreturn valve in said inlet opening and a pipe connected with the outlet of the second container.

2. A generator of aerosols containing a medicinal product comprising an air compressor, an atomizer, a pipe connecting said air compressor with the atomizer, means for feeding the product that is to form the aerosol to said atomizer, a container into which the atomizer projects a suspension of said product in a jet of compressed air from a compressor, a baffle system at the outlet of the container adapted to collect the larger liquid particles of the suspension impinging against its surfaces, an outer container inside which the first container is housed and adapted to be fed by the aerosol formed by the suspension passing out of the baffle system, after separation of the liquid particles impinging on the baffle system surfaces, said outer container being made at least partially of transparent material and provided with a gauged inlet for atmospheric air, a nonreturn valve in said opening, means for applying the aerosol to the patient and a pipe connecting the outlet of the second container with last mentioned means.

3. A generator of aerosols containing a medicinal product comprising an air compressor, an atomizer, a pipe connecting said air compressor with the atomizer, means for feeding the product that is to form the aerosol to said atomizer, a container into which the atomizer projects a suspension of said product in a jet of compressed air from the compressor, a baffle system at the outlet of the container adapted to collect the larger liquid particles of the suspension impinging against its surfaces, an outer container inside which the first container is housed and adapted to be fed by the aerosol formed by the suspension passing out of the baffle system, after separation of the liquid particles impinging on the baffle system surfaces, said outer container being made at least partially of transparent material and provided with a gauged inlet of atmospheric air, means for adjusting the cross-sectional area of said gauged inlet opening, a nonreturn valve in said opening, means for applying the aerosol to the patient and a pipe connecting the outlet of the second container with last mentioned means.

4. A generator of aerosols containing a medicinal product comprising an air compressor, means for heating the compressed air produced by said compressor, an atomizer, a pipe connecting said air compressor with the atomizer, means for feeding the product that is to form the aerosol to said atomizer, a container into which the atomizer projects a suspension of said product in a jet of compressed air from the compressor, a baffle system at the outlet of the container adapted to collect the larger liquid particles of the suspension impinging against its surfaces, an outer container inside which the first container is housed and adapted to be fed by the aerosol formed by the suspension passing out of the baffle system, after separation of the liquid particles impinging on the baffle system surfaces, said outer container being made at least partially of transparent material and provided with a gauged inlet for atmospheric air, a nonreturn valve in said opening, means for applying the aerosol to the patient and a pipe connecting the outlet of the second container with last mentioned means.

5. A generator of aerosols containing a medicinal product comprising an air compressor, an atomizer, a pipe connecting said air compressor with the atomizer, means for feeding the product that is to form the aerosol to said atomizer, a container into which the atomizer projects a suspension of said product in a jet of compressed air from the compressor, an adjustable baffle system at the outlet of the container adapted to collect the larger liquid particles of the suspension impinging against its surfaces, an outer container inside which the first container is housed and adapted to be fed by the aerosol formed by the suspension passing out of the baffle system, after separation of the liquid particles impinging on the baffle system surfaces, said outer container being made at least partially of transparent material and provided with a gauged inlet for atmospheric air, a nonreturn valve in said opening, means for applying the aerosol to the patient and a pipe connecting the outlet of the second container with last mentioned means.

6. A generator of aerosols containing a medicinal product comprising an air compressor, an atomizer, a pipe connecting said air compressor with the atomizer, means for feeding the product that is to form the aerosol to said atomizer, a cylindrical container open at one end and into the opposite end of which the atomizer projects a suspension of said product in a jet of compressed air from the compressor, a baffle system at the open end of the container adapted to collect the larger liquid particles of the suspension impinging against its surfaces, said baffle system including a cap fitted over the first end of the container and provided with openings in its medial part, a cylindrical partition projecting into the container from a line formed in the cap on the outside of its openings, extending in substantially coaxial relationship with the container, a third coaxial member constituted by a cylindrical wall extending between the projecting partition and the corresponding portion of the inner surface of the container and by a bottom closing said wall at its end remote from the cap and defining a sinuous path for the suspension with the container and the projecting partition, an outer container inside which the first container is housed and adapted to be fed by the aerosol formed by the suspension passing out of the baffle system, after separation of the liquid particles impinging on the baffle system surfaces, said outer container being made at least partially of transparent material and provided with a gauged inlet for atmospheric air, a nonreturn valve in said opening, means for applying the aerosol to the patient and a pipe connecting the outlet of the second container with last mentioned means.

7. A generator of aerosols containing a medicinal product comprising an air compressor, an atomizer, a pipe connecting said air compressor with the atomizer, means for feeding the product that is to form the aerosol to said atomizer, a cylindrical container open at one end and into the opposite end of which the atomizer projects a suspension of said product in a jet of compressed air from the compressor, a baffle system at the outlet of the container adapted to collect the larger liquid particles of the suspension impinging against its surfaces, said baffle system including a cap fitted over the first end of the container and provided with openings in its medial part, a cylindrical partition projecting into the container from a line formed in the cap on the outside of the openings, extending in substantially coaxial relationship with the container, a third coaxial member constituted by a cylindrical wall extending between the projecting partition and the corresponding portion of the inner surface of the container and by a bottom closing said wall at its end remote from the cap and provided with perforations and defining a sinuous path for the suspension with the container and the projecting partition, a threaded rod carrying the bottom of the third member and slidingly passing through the centre of the cap, a knob controlling the upper end of said rod, a nut screwed over said rod and radial spokes rigidly connecting said nut with the free edge of the projecting partition, an outer container inside which the first container is housed and adapted to be fed by the aerosol formed by the suspension passing out of the baffle system, after separation of the liquid particles impinging on the baffle system surfaces, said outer container being provided with a gauged inlet for atmospheric air, a nonreturn valve in said opening, means for applying the aerosol to the patient and a pipe connecting the outlet of the second container with last mentioned means.

8. A generator of aerosols containing at least one liquid basic product intended for inhalation comprising a compressor of aeriform fluid, an atomizer, a pipe connecting said gas compressor with the atomizer, means for feeding the product that is to form the aerosol to said atomizer, a container into which the atomizer projects a suspension of said product in a jet of compressed fluid from the compressor, a baffle system at the outlet of the container adapted to collect the larger liquid particles of the suspension impinging against its surfaces, said baffle system including a plurality of spaced superposed perforated plates fitted inside the container, the perforations in the successive plates being in staggered relationship, an outer container inside which the first container is housed and fed by the aerosol formed by the suspension passing out of the baffle system, after separation of the liquid particles impinging on the baffle system surfaces, said outer container being provided with an outlet and a gauged inlet opening for atmospheric air, a nonreturn valve in said inlet opening and a pipe connected with the outlet of the second container.

9. A generator of aerosols containing at least one liquid basic product intended for inhalation comprising a compressor of aeriform fluid, an atomizer, a pipe connecting said gas compressor with the atomizer, means for feeding the product that is to form the aerosol to said atomizer, a container into which the atomizer projects a suspension of said product in a jet of compressed fluid from the compressor, a baffle system at the outlet of the container adapted to collect the larger liquid particles of the suspension impinging against its surfaces, said baffle system including a plurality of spaced stationary perforated plates fitted inside the container and a rotary plate system constituted by a rod extending through the stationary plates, by auxiliary perforated plates rigid with said rod and housed inside the container between the successive stationary plates, and by a hand operable knob controlling the angular location of the rod, an outer container inside which the first container is housed and fed by the aerosol formed by the suspension passing out of the baffle system, after separation of the liquid particles impinging on the baffle system surfaces, said outer container being provided with an outlet and a gauged inlet opening for atmospheric air, a nonreturn valve in said inlet opening and a pipe connected with the outlet of the second container.

10. A generator of aerosols containing at least one liquid basic product intended for inhalation comprising a compressor of aeriform fluid, means for heating the compressed fluid produced by said air compressor, means for adjusting last mentioned means, an atomizer, a pipe connecting said gas compressor with the atomizer, means for feeding the product that is to form the aerosol to said atomizer, a container into which the atomizer projects a suspension of said product in a jet of compressed fluid from the compressor, a baffle system at the outlet of the container adapted to collect the larger liquid particles of the suspension impinging against its surfaces, an outer container inside which the first container is housed and fed by the aerosol formed by the suspension passing out of the baffle system, after separation of the liquid particles impinging on the baffle system surfaces, said outer container being provided with an outlet and a gauged inlet opening for atmospheric air, means for adjusting the cross-sectional area of said gauged inlet opening, a nonreturn valve in said inlet opening and a pipe connected with the outlet of the second container.

11. A generator of aerosols containing a medicinal product comprising an air compressor, an atomizer, a pipe connecting said air compressor with the atomizer, means for feeding the product that is to form the aerosol to said atomizer, a container into which the atomizer projects a suspension of said product in a jet of compressed air from the compressor, an adjustable baffle system at the outlet of the container adapted to collect the larger liquid particles of the suspension impinging against its surfaces, an outer container inside which the first container is housed and adapted to be fed by the aerosol formed by the suspension passing out of the baffle system, after separation of the liquid particles impinging on the baffle system surfaces, said outer container being provided with a gauged inlet for atmospheric air, means for adjusting the cross-sectional area of said gauged inlet opening, a nonreturn valve in said opening, means for applying the aerosol to the patient and a pipe connecting the outlet of the second container with last mentioned means.

12. A generator of aerosols containing a medicinal product comprising an air compressor, means for heating the compressed air produced by said compressor, an atomizer, a pipe connecting said air compressor with the atomizer, means for feeding the product that is to form the aerosol to said atomizer, a container into which the atomizer projects a suspension of said product in a jet of compressed air from the compressor, an adjustable baffle system at the outlet of the container adapted to collect the larger liquid particles of the suspension impinging against its surfaces, an outer container inside which the first container is housed and adapted to be fed by the aerosol formed by the suspension passing out of the baffle system, after separation of the liquid particles impinging on the baffle system surfaces, said outer container being provided with a gauged inlet for atmospheric air, a nonreturn valve in said opening, means for applying the aerosol to the patient and a pipe connecting the outlet of the second container with last mentioned means.

13. A generator of aerosols containing a medicinal product comprising an air compressor, means for heating the compressed air produced by said compressor, an atomizer, a pipe connecting said air compressor with the atomizer, means for feeding the product that is to form the aerosol to said atomizer, a container into which the atomizer projects a suspension of said product in a jet of compressed air from the compressor, an adjustable baffle system at the outlet of the container adapted to collect the larger liquid particles of the suspension impinging against its surfaces, an outer container inside which the first container is housed and adapted to be fed by the aerosol formed by the suspension passing out of the baffle system, after separation of the liquid particles impinging on the baffle system surfaces, said outer container being provided with a gauged inlet for atmospheric air, means for adjusting the cross-sectional area of said gauged inlet opening, a nonreturn valve in said opening, means for applying the aerosol to the patient and a pipe connecting the outlet of the second container with last mentioned means.

14. An aerosol generator comprising an air compressor, adjustable means for heating the compressed air produced by the compressor, a pipe fed by the heated compressed air at the outlet of last mentioned means, an atomizer fed by said pipe, means feeding the atomizer with a liquid product to be incorporated to an aerosol, a container having an inlet fed by the jet of compressed air and liquid suspended therein formed by the atomizer and an outlet registering with the axis of the jet, a system of baffle plates fitted in the outlet of the container and adapted to stop the heavier particles of liquid and thereby to transform the suspension into an aerosol that passes out of the baffle system, an outer container enclosing the outlet of the baffle system and provided with an outlet registering with the outlet of the baffle system, a receiver for the aerosol passing out of the outlet of the outer container and adjustable nonreturn inlet means for atmospheric air into the outer container.

FERNAND GAUCHARD.

No references cited.